United States Patent Office 3,453,302
Patented July 1, 1969

3,453,302
COBALT HYDRO-PHOSPHIN-CARBONYLS
Gianfranco Pregaglia, Milan, and Renato Castelli and Alberto Andreetta, Novara, Italy, assignors to Montecatini Edison S.p.A., Milan, Italy
No Drawing. Filed Mar. 2, 1967, Ser. No. 619,916
Claims priority, application Italy, Mar. 4, 1966, 4,892/66
Int. Cl. C07f 15/06
U.S. Cl. 260—439                              7 Claims

ABSTRACT OF THE DISCLOSURE

Cobalt hydrocarbonyls of the formula $$HCo(CO)(PR_3)_3$$

wherein R is alkyl from 1 to 10, useful as hydrogenation catalysts.

---

Our present invention relates to a series of cobalt hydrocarbonyls, to their preparation method and to their use as hydrogenation catalysts. The compounds of this invention, have the following formula:

$$HCo(CO)(PR_3)_3$$

wherein R is an alkyl group containing from 1 to 10 carbon atoms.

Our copending patent application Ser. No. 613,762 filed Feb. 3, 1967, discloses a family of cobalt hydrophosphin-carbonyls having the general formula $$HCo(CO)_2(PR_3)_2$$

which are useful as hydrogenation catalysts for numerous classes of organic compounds.

We have now prepared a new class of cobalt hydrocarbonyls containing a higher number of ligands different from carbon monoxide and having the general formula $HCo(CO)(PR_3)_3$. These triphosphine-substituted hydrocarbonyls are active hydrogenation catalysts. They are soluble in many common organic solvents (hydrocarbons, alcohols, ketones) and may be used even in solution in the substances which are to be reduced. The hydrogenation, catalyzed by these new cobalt hydrocarbonyls, of compounds containing carbonyls, double and triple bonds C—C, such as alkenes, alkynes, ketones, saturated and unsaturated aldehydes, etc., occurs easily in homogeneous phase.

We prepare the compounds of the present invention by reacting in hydrocarbon (alkanes, cycloalkanes, arenes) solution, at 40–150° C., under hydrogen pressure 1–100 atm), a bi-nuclear compound of the type $$[Co(CO)_3PR_3]_2$$

with a trialkylphosphine, in the presence of an olefin which, under the working conditions, is capable to "extract" two mols of carbon monoxide for each cobalt atom from the starting compound.

The phosphine in excess may be of the same kind already contained in the cobalt compound used or may contain radicals R of different length. In the latter case, triphosphine-substituted cobalt hydrocarbonyl having mixed ligands will be obtained. Used as the olefin is an α-olefin having less than 8 carbon atoms, and preferably, propylene or ethylene. The carbon monoxide, which is extracted from the starting cobalt compound, attaches itself to the olefin used, thus giving the corresponding alcohol having one further carbon atom in the molecule. The solutions obtained from the described reaction are clear and vary in color between yellow and brown-green. The I.R. spectra, carried out at the Perkin-Elmer spectrometer, model 21, using NaCl cell of 0.05 mm., show two strong bands at 5.21 and 5.30 microns; the band at 5.1 microns, characteristic of $[Co(CO)_3PR_3]_2$, is absent.

When $[Co(CO)_3PBu_3]_2$ is used as the starting compound, in an excess of tri-n-butylphosphine and propylene, clear solutions, colored in yellow-green, are obtained. After heating under a strong vacuum at 60° C. in order to remove the volatile substances, a residue consisting of an oily, clear, yellow-green colored liquid remains, which, upon analysis, gave the following results:

Calculated for $HCo(CO)(PBu_3)_3$: Co, 8.51%; C, 64%; H, 11.81%; CO, 4.04%. Found: Co, 8.1%; C, 64.05%; H, 11.75%; CO, 3.95%.

The NMR spectrum of the oily compound, carried out in an apparatus at 60 mc., shows a quartet at 13.9 p.p.m. at higher field from $Si(CH_3)_4$ with a coupling constant $J=48$ c.p.s. The position is characteristic for the hydrides of this type. The I.R. spectrum of the oily compound (thickness less than 0.01 mm.) shows bands at 5.24 and 5.30 microns corresponding to the ones of the compounds in solution prepared according to the above-described method. Furthermore, the compound appears to be diamagnetic. The whole of the results confirms the structure:

$$HCo(CO)(PBu_3)_3$$

for the compound under examination.

The invention will be further illustrated by some examples, which do not have a limitative character, and which relate both to the preparation of the new claimed compounds and to their use in the hydrogenation of different organic compounds.

EXAMPLE 1

In a 500 cc. inox steel autoclave purged with nitrogen, a homogeneous solution consisting of 220 cc. of n-heptane, 13 g. (18.85 mM.) of $[Co(CO)_3PBu_3]_2$ and 46.5 g. (230 mM.) of $P(n-C_4H_9)_3$ is introduced. Then, 37 g. of propylene are introduced. The whole is heated at 115° C. and 12 atm. of hydrogen are pumped giving a total pressure of 30 atm. The hydrogen is absorbed and fresh hydrogen is supplied until no pressure decrease occurs. During the reaction, the pressure is kept between a total of 35–30 atm. and the temperature between 115° and 117° C. At the end of the reaction, the autoclave is cooled, the gases are discharged and the operation is repeated for five times using at each time 35 g. of olefin. If autoclaves having suitable characteristics are available, the operation can be carried out by introducing at the beginning all the amount of the necessary olefin and then regulating the course of the reaction by hydrogen feeding. A clear, yellow-green colored solution is obtained, which at the I.R. shows two strong bands at 5.24 and 5.30 microns, with no trace of the characteristic band at 5.1 microns of the starting compound $$[Co(CO)_3PBu_3]_2$$

EXAMPLE 2

In a 200 cc. inox steel shaking autoclave, after careful sweeping with nitrogen, 90 cc. of n-heptane, 1.88 g. of dicobaltoctacarbonyl (5.5 mM.) and 8.4 g. of triethylphosphine (71.2 mM.) are introduced. The whole is agitated for 20 minutes at room temperature in order to obtain the salt compound $$[Co(CO)_3(PEt_3)_2]^+[Co(CO)_4]^-$$

After having discharged the gases, the autoclave is heated at 70° C. in order to transform the salt into the covalent compound $[Co(CO)_3PET_3]_2$. After 30 minutes the whole is cooled, the gases are discharge and 12.2 g. of propylene are introduced in the autoclave. The whole is heated at 115° C. and then 15 atm. of hydrogen are compressed giving a total pressure of 30 atm. The hydrogen consumed is continuously supplied until a pressure decrease is no longer observed. During the reaction, the pressure is maintained between 35–30 atm. and the temperature between 115 and 118° C. After having cooled the autoclave and discharged the gases, the described operation is repeated an additional five times consuming a total of 61.2 g. of olefin. At the end, a clear, yellow-green colored solution is obtained, which at the I.R. shows two strong bands at 5.23 and 5.30 microns, the characteristic band at 5.1 microns of the compound $[Co(CO)_3PEt_3]_2$, being absent.

EXAMPLE 3

This run is carried out as in Example 2 using the same amounts of reactants, but using tri-n-hexylphosphine in lieu of triethylphosphine and working at 140° C. in the transformation of the salt into the covalent compound. At the end, a clear, yellow-brown colored solution is obtained, which at the I.R. spectrum shows two strong bands at 5.24 and 5.30 microns, characteristic of the compound $HCoCO(PR_3)_3$ and a low intensity band at 5.1 microns showing the presence of small amounts of

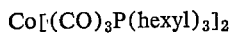

EXAMPLE 4

11.5 mM. of $HCo(CO)(PBu_3)_3$ dissolved in 130 cc. of n-heptane are introduced in the 200 cc. autoclave together with 8.1 g. (139.5 mM.) of pure acetone. 20 atm. of cold hydrogen are compressed and the whole is heated at 130° C. The reaction is carried out at a pressure of 35–30 atm. The absorption of the gas begins at 110° C., and the reaction ends within 5 hours. A clear, yellow solution, which according to the gas chromatographic analysis contains 8.20 g. (136.5 mM.) of isopropyl alcohol and 0.33 g. (5.7 mM.) of acetone, is discharged.

EXAMPLE 5

11 mM. of $HCo(CO)(PBu_3)_3$, 120 cc. of n-heptane and 16.75 g. (133 mM.) of freshly distilled 2-ethylhexenal, are introduced in the 200 cc. shaking autoclave. 70 atm. of hydrogen are compressed in the cold and the whole is heated at 90° C. The reaction is carried out at this temperature and at a pressure of 90–100 atm. The hydrogen absorption begins at 80° C. and the reaction is completed within 3 hours. A clear, yellow-green solution, which upon the gas chromatographic analysis is seen to contain 16.8 g. (129.2 mM.) of 2-ethylhexyl alcohol, 0.36 g. (2.81 mM.) of 2-ethylhexanoic aldehyde and 0.12 g. (0.95 mM.) of 2-ethylhexenoic aldehyde, is obtained.

EXAMPLE 6

In the autoclave, a solution containing 130 cc. of n-heptane, 11.2 mM. of $HCo(CO)(PBu_3)_3$ and 10 g. (139 mM.) of freshly distilled n-butyraldehyde, is introduced. 20 atm. of hydrogen are compressed in cold and the whole is heated at 90° C. carrying out the reaction at a total pressure of 30–35 atm. The hydrogen absorption starts at 81° C., and is completed within 27 minutes. A clear, yellow-green colored solution, containing 10.2 g. (138 mM.) of n-butyl alcohol and 0.79 g. (1.10 mM.) of butyraldehyde (determined by gas-chromatographic analysis) is discharged.

EXAMPLE 7

In the 200 cc. autoclave, 110 cc. of n-heptane, 10.6 mM. of $HCo(CO)(PET_3)_3$ and 8.1 g. (112.5 mM.) of freshly rectified n-butyraldehyde are introduced. Then, in cold, 25 atm. of $H_2$ are introduced and the whole is heated at 85° C., the reaction being carried out at a total pressure of 30–35 atm. The absorption of hydrogen starts at 70° C. and is completed within 1 hour. A yellow-green solution, which upon gas-chromatography is seen to contain 8.1 g. (109.5 mM.) of n-butyl alcohol and 0.12 g. (1.67 mM.) of n-butyraldehyde, is discharged.

EXAMPLE 8

This example shows the selectivity of the catalyst in the reduction of acetylene hydrocarbons by varying the reaction temperature. In a comparative test, in the presence of $[Co(CO)_3PBu_3]_2$, no hydrogenation of the acetylene hydrocarbon is observed.

In the 200 cc. autoclave, a heptane solution consisting of 11.2 mM. of $HCo(CO)(PBu_3)_3$, 4.5 g. (40.9 mM.) of 1-octyne and 120 cc. of n-heptane are introduced. 20 atm. of $H_2$ are compressed in cold and the whole is heated at 50° C. The absorption starts at this temperature and is completed within 1 hour. The pressure is kept between 20–25 atm. during the reaction. A clear, yellow colored solution, which, upon gas-chromatographic analysis is seen to contain 4.1 g. (36.6 mM.) of 1-octene, 0.3 g. (2.63 mM.) of n-octane and 0.11 (1 mM.) of 1-octyne, is discharged.

When the reaction is carried out using the same amounts of reactants at 98° C. and a total pressure of 25 atm., the reaction is completed within 2 hours and 15 minutes to give a clear, yellow colored solution containing 4.45 g. (39 mM.) of octane and 0.12 g. (1 mM.) of 1-octene.

On the other hand, by working in the presence of 3.9 g. of $[Co(CO)_3PBu_3]_2$, and 2.9 g. (26.4 mM.) of 1-octyne dissolved in 100 cc. of n-heptane at 75° C. and 25 atm. of hydrogen, no absorption of gas is noted. After three hours reaction time, a red, clear solution containing only unreacted 1-octyne, is discharged.

EXAMPLE 9

In the autoclave, a solution consisting of 120 cc. of n-heptane, 11 mM. of $HCo(CO)(PBu_3)_3$ and 18.5 g. (154 mM.) of acetophenone is introduced. 30 atm. of hydrogen are compressed in cold and then the autoclave is heated up to 110° C. At 100° C., a slow hydrogen absorption starts and the reaction is carried out at a pressure of 30 atm. for 5 hours. At the end, a yellow-green solution, which at the gas chromatographic analysis results in containing 13.7 g. (112.2 mM.) of α-phenylethyl alcohol $C_6H_5$—CHOH—$CH_3$ and 4.80 g. (40 mM.) of acetophenone, is discharged.

EXAMPLE 10

A n-heptane solution consisting of 120 cc. of n-heptane, 12 mM. of $HCo(CO)(P(hexyl)_3)_3$ and 10 g. (139 mM.) of n-butyraldehyde is introduced in the 200 cc. autoclave. 20 atm. of hydrogen are compressed in cold and the whole is heated at 95° C., carrying out the reaction at a pressure of 35 atm. for 1 hour. At the end, a yellow-amber solution which, upon gas-chromatographic analysis is seen to contain 9.03 g. (122 mM.) of n-butyl alcohol and 0.94 g. (13 mM.) of n-butyraldehyde, is obtained.

We claim:

1. Cobalt hydro-phosphin-carbonyls of the formula:

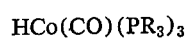

wherein R is alkyl having from 1 to 10 C and having I.R. bands at 5.24 and 5.30 microns.

2. The process for preparing the compounds of claim 1, which comprises reacting a cobalt carbonyl of the formula $[Co(CO)_3(PR_3)]_2$ in hydrocarbon solution under hydrogen pressure between 1 and 100 atm., at a temperature comprised between 40 and 150° C., with a trialkylphosphine $PR_3$, in the presence of an α-olefin having up to 8 C.

3. The process of claim 2, wherein the hydrocarbon is selected from alkane, cycloalkane and arene.

4. The process of claim 2, wherein the olefin is ethylene.

5. The process of claim 2, wherein the olefin is propylene.

6. The compound of claim 1, which is $$HCo(CO)(PBu_3)_3$$

7. The compound of claim 1, which is $$HCo(CO)(PEt_3)_3$$

References Cited

Kruck et al.: Bu., 98 (1965), pp. 3060–5, 3068–9.

TOBIAS E. LEVOW, Primary Examiner.

A. P. DEMERS, Assistant Examiner.

U.S. Cl. X.R.

252—431; 260—602, 618, 683.9, 690